J. KOCH.
MECHANICAL VIBRATOR.
APPLICATION FILED JUNE 29, 1911.
1,013,782.
Patented Jan. 2, 1912.
2 SHEETS—SHEET 1.
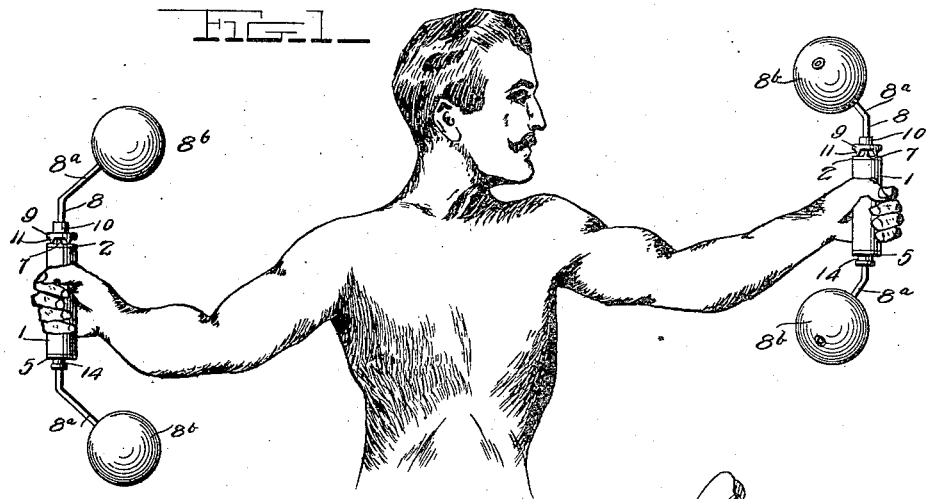
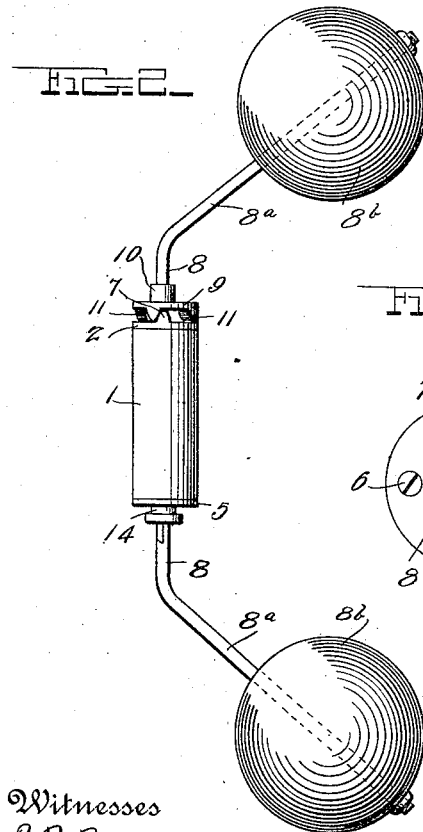
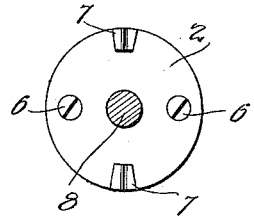
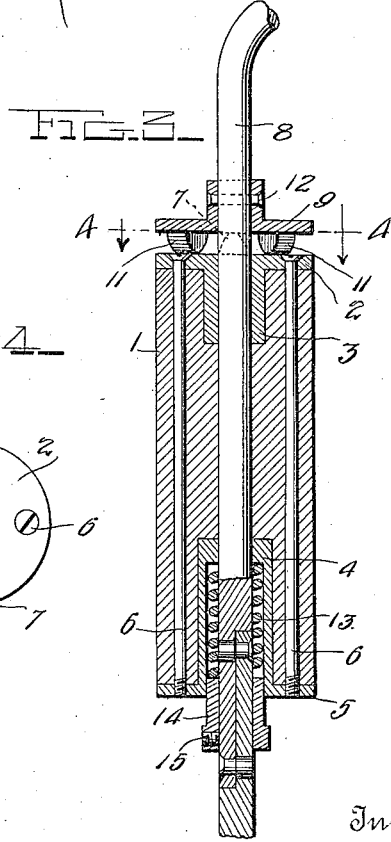

J. KOCH.
MECHANICAL VIBRATOR.
APPLICATION FILED JUNE 29, 1911.
1,013,782.
Patented Jan. 2, 1912.
2 SHEETS—SHEET 2.
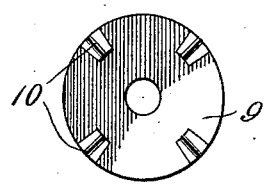
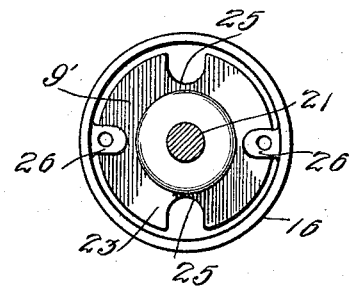
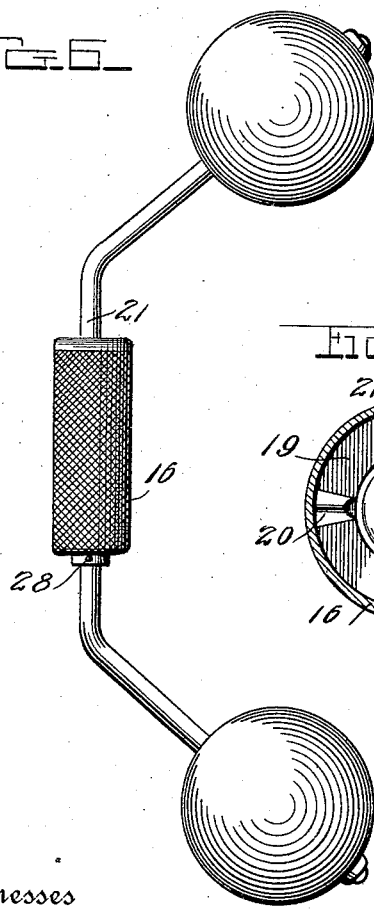
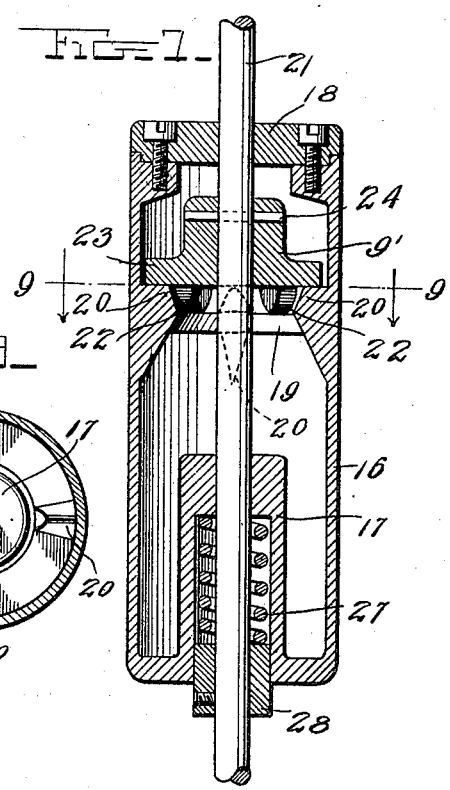
Witnesses
J. R. Pierce
L. O. Hilton
Inventor
J. Koch.
by H. B. Willson & Co.
Attorneys

UNITED STATES PATENT OFFICE.

JOHN KOCH, OF NEW YORK, N. Y.

MECHANICAL VIBRATOR.

1,013,782. Specification of Letters Patent. Patented Jan. 2, 1912.

Application filed June 29, 1911. Serial No. 635,949.

*To all whom it may concern:*

Be it known that I, JOHN KOCH, residing at New York, in the county of New York and State of New York, have invented certain new and useful Improvements in Mechanical Vibrators; and I do declare the following to be a full, clear, and exact description of the invention, such as will enable others skilled in the art to which it appertains to make and use the same.

This invention relates to improvements in mechanical vibrators.

One object of the invention is to provide an improved construction of vibrator adapted to be operated by hand, thus affording an efficient exercise as well as producing beneficial vibrations which may be regulated at will.

With this and other objects in view, the invention consists of certain novel features of construction, and the combination and arrangement of parts as will be more fully described and particularly pointed out in the claims.

In the accompanying drawings: Figure 1 is a view showing the manner of using my improved vibrator; Fig. 2 is a side view of one of the vibrators; Fig. 3 is a central vertical section of the handle and operating parts of the vibrator; Fig. 4 is a cross sectional view on the line 4—4 of Fig. 3; Fig. 5 is a plan view of the inner side of the revolving cam; Fig. 6 is a side view of a modified form of the vibrator; Fig. 7 is a central vertical sectional view of the same; Fig. 8 is a plan view with the cover plate removed; Fig. 9 is a horizontal section on the line 9—9 of Fig. 7.

My improved vibrator comprises a tubular handle 1 formed of any suitable material. Arranged on one end of the handle is a cam plate 2 having an inwardly extending bearing sleeve 3 which projects into the bore of the handle. In the opposite end of the handle is arranged a spring casing and bearing sleeve 4 on the outer end of which is formed an attaching plate 5. The plates 2 and 5 are securely fastened in place on the handle by long screws 6 which extend through the plate 2 and entirely through the handle and are screwed into thread passages in the plate 5. On the plate 2 are formed cam lugs 7 two of which are shown in the present instance said lugs being arranged at diametrically opposite points.

Revolubly mounted in the bearing sleeves 3 and 4 is a vibrating shaft 8 the ends of which extend beyond the ends of the handle and are bent at suitable angles to form cranks 8$^a$. On the cranked ends of the shaft are fixedly secured suitable weights which are here shown and are preferably in the form of balls 8$^b$.

Secured to the shaft 8 adjacent to the cam plate 2 is a revolving co-acting cam 9 comprising a sleeve 10 having a flanged inner end on which is formed a plurality of cam lugs 11, four of which are shown in the present instance, said lugs being arranged at diametrically opposite points, as shown and are adapted to co-act with the cam lugs 7 fixed on the plate 2. The sleeve 10 is secured in position on the shaft by transversely disposed fastening pins 12 which are inserted through the sleeve and shaft as shown.

Arranged on the shaft and within the spring casing 4 is a coiled spring 13 one end of which bears against the inner end of the casing 4 and the outer end is engaged with a stop collar 14 which is adjustably secured to the shaft 8 by a set screw 15 whereby the pressure of the spring is regulated, and a greater or less exertion required for revolving the cam 9 over the cam plate 2 by the rotary or centrifugal movement of the balls 10 and shaft 8. By this means the device may be readily adapted for the use of persons of different strength.

In Figs. 6 to 9 of the drawing is shown a slightly modified form of the invention comprising a hollow handle 16 in the lower end of which is formed a combined spring casing and bearing sleeve 17. On the upper end of the handle is arranged a bearing plate or cap 18. In the handle a suitable distance below the cap 18 is arranged an annular flange 19 which forms a fixed cam support and has arranged thereon oppositely disposed stationary cam lugs 20. Revolubly mounted in the bearing sleeve 17 and cap 18 is a vibrating shaft 21 having angular ends and weights constructed and arranged in the same manner as the shaft and weights shown in Fig. 1. On the shaft 21 immediately above the annular flange 19 and lugs 20 is fixed a revolving cam 9′ having on its central portion depending cam lugs 22 which are adapted to engage the lugs 20 and having an annular stop flange 23 also adapted to engage the lugs 20 on the flange 19 of the handle as shown. The cam 9′ is secured to the shaft 21 by transverse pins 24 or other suitable fastening devices. In the flange 23 of the cam are formed oppositely disposed recesses 25 which permit the removal of the cam past the lugs 26 on the inner side of the handle to which the cap or bearing plate 18 is secured. In the spring casing 17 and around the shaft 21 is arranged a coiled spring 27 one end of which bears against the inner end of the casing and the other end against a spring adjusting collar 28 which is secured to the shaft by a set screw and is adapted to be adjusted to regulate the pressure of the spring.

The vibrators may be used with one hand or one in each hand and in using the same the handles are grasped and with a revolving or centrifugal movement the balls or weights are swung around thus revolving the shaft. In thus revolving the shaft the lugs on the cam fixed to the shaft play over the stationary cam lugs of the handle and thus cause a vibration of the shaft which is imparted to the hands, arms and other parts of the body through the handle.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

Having thus described my invention, what I claim is:

1. A vibrator comprising a handle, cam lugs secured thereto, a shaft revolubly mounted in said handle, crank arms formed on the ends of said shaft, weights arranged on the ends of said arms, a cam fixed to said shaft, said cam having lugs adapted to play over the cam lugs on the handle, and a spring adapted to yieldingly resist the play of the cams on said shaft over the fixed cam lugs on the handle.

2. A vibrator comprising a handle, cam lugs secured thereto, a shaft revolubly mounted in said handle, crank arms formed on the ends of said shaft, weights arranged on the ends of said arms, a cam fixed to said shaft said cam having lugs adapted to play over the cam lugs on the handle, a spring casing arranged in the lower end of said handle, a spring arranged in said casing and a collar adjustably secured to said shaft and adapted to engage said spring whereby the pressure of the same is regulated and the play of the cam on the shaft over the fixed cams thus yieldingly resisted.

3. A vibrator comprising a hollow handle, having formed in one end a combined bearing sleeve and spring casing, an annular cam supporting flange formed in said handle, cam lugs formed on said flange, a bearing cap secured to the upper end of the handle, a shaft revolubly mounted in said bearing sleeve and cap, a cam fixed on said shaft in said handle, lugs on said cam adapted to engage the lugs on said flange, a spring arranged on said shaft in said spring casing and a collar adjustably secured to the shaft to regulate the tension of said spring.

In testimony whereof I have hereunto set my hand in presence of two subscribing witnesses.

JOHN KOCH.

Witnesses:
 H. HUNFALVY,
 I. HALISCHKA.

---

Copies of this patent may be obtained for five cents each, by addressing the "Commissioner of Patents, Washington, D. C."